`US010095520B2`

(12) United States Patent
Fang et al.

(10) Patent No.: US 10,095,520 B2
(45) Date of Patent: Oct. 9, 2018

(54) INTERRUPT RETURN INSTRUCTION WITH EMBEDDED INTERRUPT SERVICE FUNCTIONALITY

(71) Applicant: Intel Corporation, Santa Clara, CA (US)

(72) Inventors: Zhen Fang, Portland, OR (US); Xiaowei Jiang, Hillsboro, OR (US); Srihari Makineni, Portland, OR (US); Rameshkumar G. Illikkal, Folsom, CA (US); Ravishankar Iyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/194,558

(22) Filed: Jun. 27, 2016

(65) Prior Publication Data

US 2016/0306630 A1    Oct. 20, 2016

Related U.S. Application Data

(63) Continuation of application No. 13/997,651, filed as application No. PCT/US2011/066950 on Dec. 22, 2011, now Pat. No. 9,378,164.

(51) Int. Cl.
*G06F 9/30* (2018.01)
*G06F 9/32* (2018.01)
(Continued)

(52) U.S. Cl.
CPC ............ *G06F 9/3016* (2013.01); *G06F 9/327* (2013.01); *G06F 9/3861* (2013.01); *G06F 13/24* (2013.01); *G06F 9/4806* (2013.01); *G06F 9/4812* (2013.01)

(58) Field of Classification Search
CPC .......... G06F 9/3016; G06F 9/327; G06F 9/48; G06F 9/4806; G06F 13/24
See application file for complete search history.

(56) References Cited

U.S. PATENT DOCUMENTS 4,349,872 A  9/1982 Fukasawa et al.
4,438,492 A  3/1984 Harmon, Jr. et al.
(Continued)

FOREIGN PATENT DOCUMENTS

EP  0992889 A1 * 4/2000 ............. G06F 9/325
TW  200417926 A  9/2004
(Continued)

OTHER PUBLICATIONS

Office Action from Counterpart Taiwan Patent Application No. 101148092, dated Oct. 28, 2014, 4 Pages.
(Continued)

*Primary Examiner* — Glenn A Auve
(74) *Attorney, Agent, or Firm* — Nicholson De Vos Webster & Elliott LLP

(57) ABSTRACT

An instruction pipeline implemented on a semiconductor chip is described. The semiconductor chip includes an execution unit having the following to execute an interrupt handling instruction. Storage circuitry to hold different sets of micro-ops where each set of micro-ops is to handle a different interrupt. First logic circuitry to execute a set of said sets of micro-ops to handle an interrupt that said set is designed for. Second logic circuitry to return program flow to an invoking program upon said first logic circuitry having handled said interrupt.

25 Claims, 7 Drawing Sheets

(51) Int. Cl.
*G06F 9/38* (2018.01)
*G06F 13/24* (2006.01)
*G06F 9/48* (2006.01)

(56) References Cited

U.S. PATENT DOCUMENTS

| | | | | |
|---|---|---|---|---|
| 4,709,324 | A * | 11/1987 | Kloker | G06F 9/3861 |
| | | | | 712/207 |
| 5,774,711 | A | 6/1998 | Henry et al. | |
| 5,778,220 | A | 7/1998 | Abramson et al. | |
| 5,850,562 | A * | 12/1998 | Crump | G06F 11/3466 |
| | | | | 713/1 |
| 5,901,309 | A | 5/1999 | Hammer et al. | |
| 6,581,154 | B1 | 6/2003 | Zaidi | |
| 7,213,137 | B2 | 5/2007 | Boom et al. | |
| 8,051,235 | B1 * | 11/2011 | Yearsley | G06F 9/4812 |
| | | | | 710/269 |
| 9,378,164 | B2 * | 6/2016 | Fang | G06F 13/24 |
| 2002/0073262 | A1 | 6/2002 | Godfrey | |
| 2005/0177666 | A1 | 8/2005 | Kimelman et al. | |
| 2010/0036987 | A1 | 2/2010 | Streett et al. | |
| 2012/0239913 | A1 * | 9/2012 | Williams | G06F 11/3632 |
| | | | | 712/227 |

FOREIGN PATENT DOCUMENTS

| | | |
|---|---|---|
| TW | 200703107 | 1/2007 |
| TW | 201017531 | 5/2010 |

OTHER PUBLICATIONS

Notice of Allowance from Corresponding Taiwan Patent Application No. 101148092, dated Feb. 12, 2015, 2 pages.
PCT International Search Report for PCT Counterpart Application No. PCT/US2011/066950, 3 Pgs., (dated Aug. 27, 2012).
PCT Notification concerning Transmittal of International Preliminary Report on Patentability (Chapter I of the Patent Cooperation Treaty) for PCT Counterpart Application No. PCT/US2011/066950, 6 Pgs., (dated Jul. 3, 2014).
PCT Written Opinion of the international Searching Authority for PCT Counterpart Application No. PCT/US2011/066950, 4 Pgs., (dated Aug. 27, 2012).
Taiwan Search Report, TW Counterpart Application No. 101148092, 2 Pages, (dated Sep. 1, 2014).
Office action with English translation from Chinese Patent Application 201180075869.7 dated Aug. 29, 2016, 20 pages.
Office action with English translation from Chinese Patent Application 201180075869.7 dated Apr. 14, 2017, 8 pages.

* cited by examiner

INTERRUPT RETURN INSTRUCTION WITH EMBEDDED INTERRUPT SERVICE FUNCTIONALITY

CROSS-REFERENCE TO RELATED APPLICATIONS

The present patent application is a continuation application claiming priority from U.S. patent application Ser. No. 13/997,651, filed Jun. 24, 2013, and titled: "Interrupt Return Instruction with Embedded Interrupt Service Functionality", which is a U.S. National Phase Application under 35 U.S.C. § 371 of International Application No. PCT/US2011/066950, filed Dec. 22, 2011, and titled: "Interrupt Return Instruction with Embedded Interrupt Service Functionality", both of which are incorporated herein by reference in their entirety.

BACKGROUND

Field of Invention

The field of invention relates to computing systems generally, and, more specifically, to an interrupt return instruction with embedded interrupt service functionality.

Background

Instruction Execution Pipeline

FIG. 1 shows a high level diagram of a processing core 100 implemented with logic circuitry on a semiconductor chip. The processing core includes a pipeline 101. The pipeline consists of multiple stages each designed to perform a specific step in the multi-step process needed to fully execute a program code instruction. These typically include at least: 1) instruction fetch and decode; 2) data fetch; 3) execution; 4) write-back. The execution stage performs a specific operation identified by an instruction that was fetched and decoded in prior stage(s) (e.g., in step 1) above) upon data identified by the same instruction and fetched in another prior stage (e.g., step 2) above). The data that is operated upon is typically fetched from (general purpose) register storage space 102. New data that is created at the completion of the operation is also typically "written back" to register storage space (e.g., at stage 4) above).

The logic circuitry associated with the execution stage is typically composed of multiple "execution units" or "functional units" 103_1 to 103_N that are each designed to perform its own unique subset of operations (e.g., a first functional unit performs integer math operations, a second functional unit performs floating point instructions, a third functional unit performs load/store operations from/to cache/memory, etc.). The collection of all operations performed by all the functional units corresponds to the "instruction set" supported by the processing core 100.

The IRET Instruction

FIG. 2 pertains to the servicing of an interrupt, fault or exception. Software program code can often be viewed as multiple concurrently active programs and/or processes. Although not a strict requirement, in practice, programs/processes 202 and 203 correspond to different software and/or hardware "threads". For simplicity, since programs, processes and threads can each be viewed as a consecutive sequence of executed instructions, the term "program" will also be used to refer to a process as well as a thread.

Often, an active program 201 (e.g., a device driver or an application software program) will encounter some kind of problem and report or "throw" an interrupt, fault or exception to an interrupt handler 203 by executing an "interrupt instruction" (INTRPT_INSTR) 202. Here, an interrupt instruction 202 is any portion of program code that invokes an interrupt handler as a consequence of an interrupt, fault or exception. Moreover, any of an interrupt, fault or exception will be referred to as an "interrupt". An interrupt handler 203 is typically a system program specifically designed to handle interrupts (e.g., an interrupt handler of an Operating System (OS) kernel). Because active program 201 invokes the interrupt handler 203, active program 201 may also be referred to as the invoking program 201.

The functionality of the interrupt instruction 202 typically includes the passing of two items of information to the interrupt handler 203: i) a special code 204 and/or other item(s) of information that identify the specific problem that has been encountered; and, ii) a return address pointer 205 that identifies an address for the next instruction 206 of the invoking program 201 to be executed once the interrupt has been handled.

The interrupt handler 203 "handles" the problem that caused the interrupt to be raised. An initial part of the handling process 203a is to use the special code 204 as a look-up parameter into a lookup table 206 that identifies an initial address for a sub-routine program 203b written to handle the specific problem identified by the code 204. Program flow jumps to this sub-routine 203b and the problem that caused the interrupt is handled. Once the problem that caused the interrupt is handled, an IRET instruction 203c is executed to cause the process flow to jump back or "return" 207 to the invoking program 201. As such, the functionality of the IRET instruction includes referring to return address pointer 205 to cause the desired program flow jump.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Overview

A problem facing processor developers, particularly in the case of embedded processors for system on chip (SOC) implementations, is the definition of the processor instruction set in view of the widely expanding variety of applications that processors and SOC chips are being designed into. Without adequate precautions, designing into a "standard core" the set of all instructions that may suit any application may expand the instruction set to include too many instructions.

In the case of service interrupt handling, for instance, if special instructions were to be designed into the instruction set to specially support many of the various types of interrupts that could be raised in any application/environment, the expansion of the instruction set to support interrupt handling may reach extremes that ultimately result in a poorly designed processor for any application. That is, for example, perhaps tens or hundreds of special instructions may be designed into the standard instruction set, yet, for most applications only a small subset of the instructions would actually be needed. Moreover, the particular subset utilized might vary from application to application.

At the same time, designed in interrupt servicing hardware support across a spectrum of different possible/potential interrupts avoids an opposite set of problems of having to custom tailor the hardware support on a processor by processor, application by application basis, or, not having hardware supported interrupt handling altogether.

A solution to the problem of implementing expanded hardware support for interrupt servicing as part of a standard processor design without unduly expanding the processor's instruction set is to design the hardware support into the functionality of an IRET instruction itself. Here, the IRET instruction accepts: i) a first input operand X that identifies the particular problem that was encountered, and, ii) a second input operand Y that is a return address pointer that identifies the address of the next instruction of the invoking program to be executed once the problem that raised the interrupt is handled.

Notably, embedding hardware support for interrupt servicing into the functionality of the IRET instruction does not expand the instruction set. That is, because the same IRET instruction can be called upon to transfer control back to (potentially) any invoking program that raises (potentially) any interrupt, and, the IRET instruction has embedded in itself the ability to directly handle (potentially) any interrupt.

Figure 1:
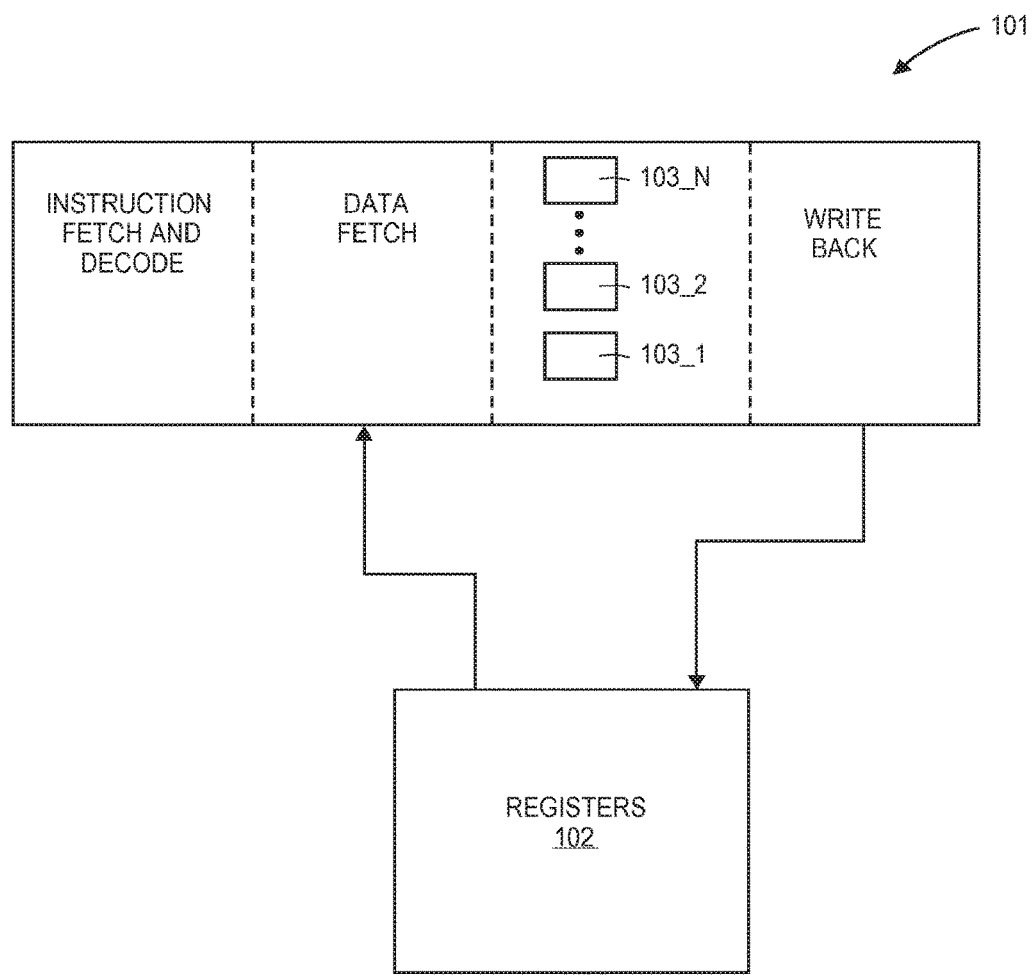
FIG. 1 shows an instruction execution pipeline.
Figure 2:
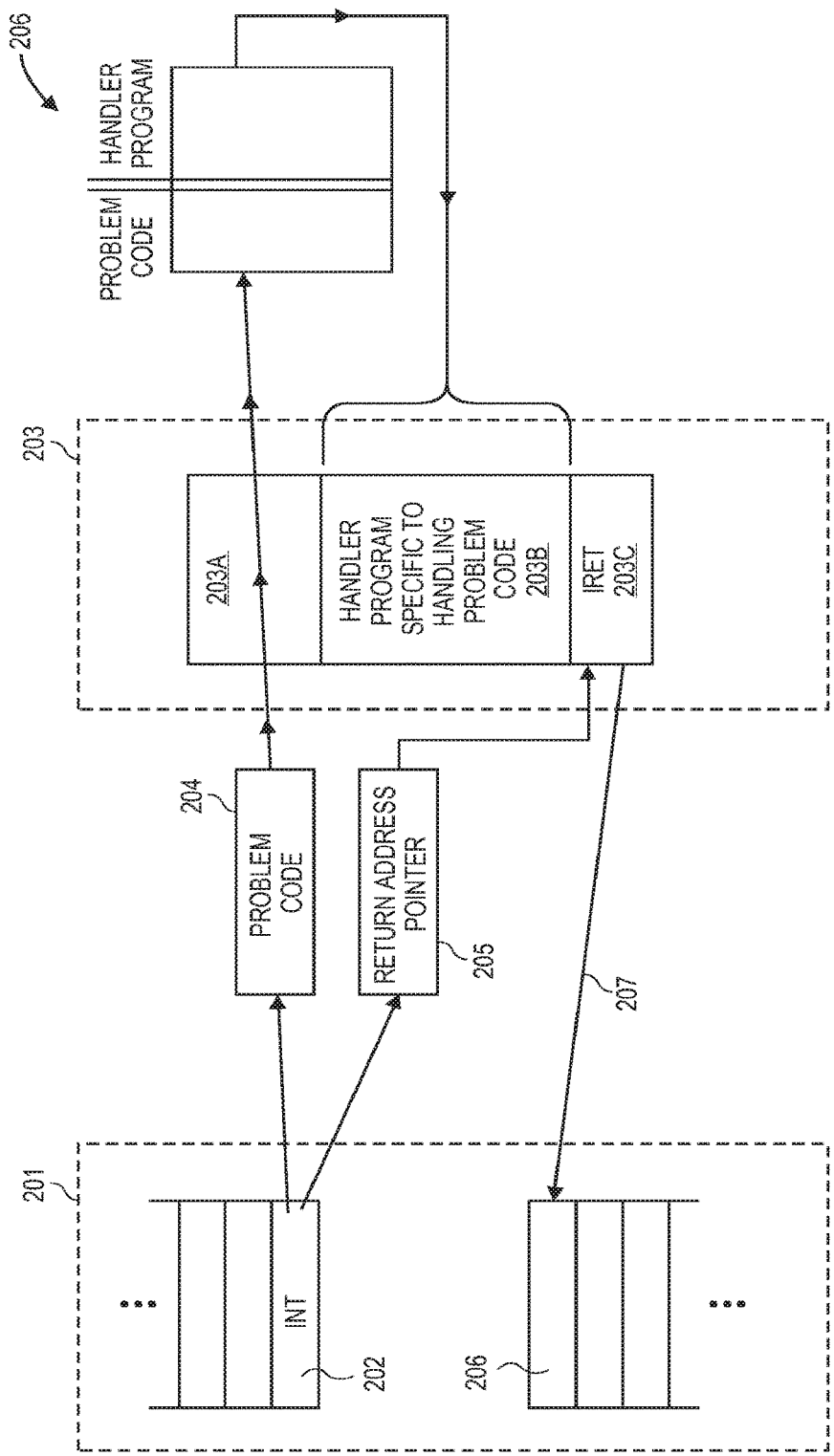
FIG. 2 shows the traditional execution of the handling of an interrupt.
Figure 3:
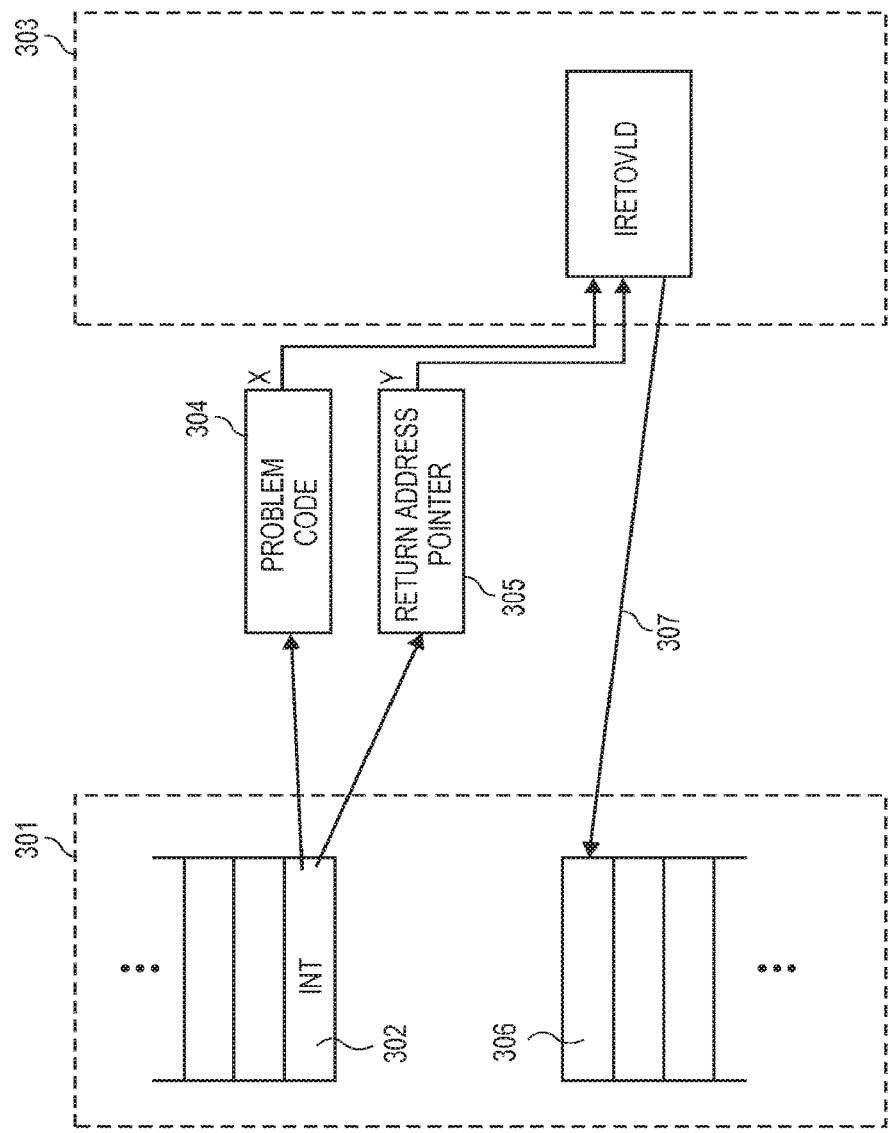
FIG. 3 shows an improved approach for the handling of an interrupt.

For convenience, the IRET instruction of the present invention will be subsequently referred to as an IRETOVLD instruction (a mnemonic for IRET "overload"). FIG. 3 shows a process flow that may be directly compared with the traditional process flow of FIG. 2. Here, like in FIG. 2, an invoking program 301 raises an interrupt 302 to an interrupt handler 303.

As before, the functionality of the interrupt instruction 302 includes the passing of two items of information to the interrupt handler 303: i) a special code 304 and/or other item(s) of information that identify the specific problem that has been encountered; and, ii) a return address pointer 305 that identifies an address for the next instruction 306 of the invoking program 301 to be executed once the interrupt has been handled.

In an embodiment, these items of information 304, 305 are formally passed by being written to register or memory space by the invoking program 301. Subsequently, the addresses of these two items are included in an instruction of the form IRETOVLD X Y. Here, X corresponds to the problem code information 304 and Y corresponds to the return address pointer 305. In an embodiment, X and Y are not explicit operands but instead are passed implicitly. For example, in a further embodiment, the X parameter is passed to the interrupt handler through parts of a control register such as the CR1 control register in x86 architectures or equivalent control register in other architectures. Moreover, the return address pointer Y is not implemented as an operand as all. Rather, the return address pointer is pushed into the kernel stack when the interrupt happens. The IRETOVLD instruction gets the return address and processor state flags from the kernel stack (and not from an explicit operand). For simplicity and ease of understanding, however, the remainder of the discussion will refer to X and Y as if they are explicit.

The reader is cautioned however that the use of control registers and the pushing of the return address into the kernel stack permits the IRETOVLD instruction to be downward compatible or otherwise called by code, that does not comprehend IRETOVLD's functionality, as a traditional IRET instruction. As such, in order to keep IRETOVLD downward compatible, or at least to be able to add new functionality without introducing a new instruction, the IRETOVLD instruction is technically implemented as an "IRET" instruction rather than a new "IRETOVLD" instruction. In this manner, new software that comprehends the "new" IRET functionality described herein can make use of it, while, for example, legacy software that does not comprehend the IRET functionality can still refer to the instruction as a traditional IRET instruction.

In response to the invocation by the invoking program 301, an IRETOVLD X Y instruction is fetched and decoded by a processor pipeline. During the pipeline's data fetch stage, the X and Y items of information 304, 305 are fetched and presented to the execution unit that performs the functionality of the IRETOVLD X Y instruction.

The execution of the IRETOVLD X Y instruction fully handles the interrupt and, when the handling is complete, returns the program flow 307 to the invoking program 301. Comparing FIGS. 2 and 3, note that the program code instructions 203a, 203b of FIG. 2 used to lookup the appropriate handling sub-routine, and, implement the sub-routine itself, need not be executed in the process of FIG. 3. Ideally, only the IRETOVLD X Y instruction is executed to fully service the interrupt and return the program flow back to the invoking program 301.

Figure 4:
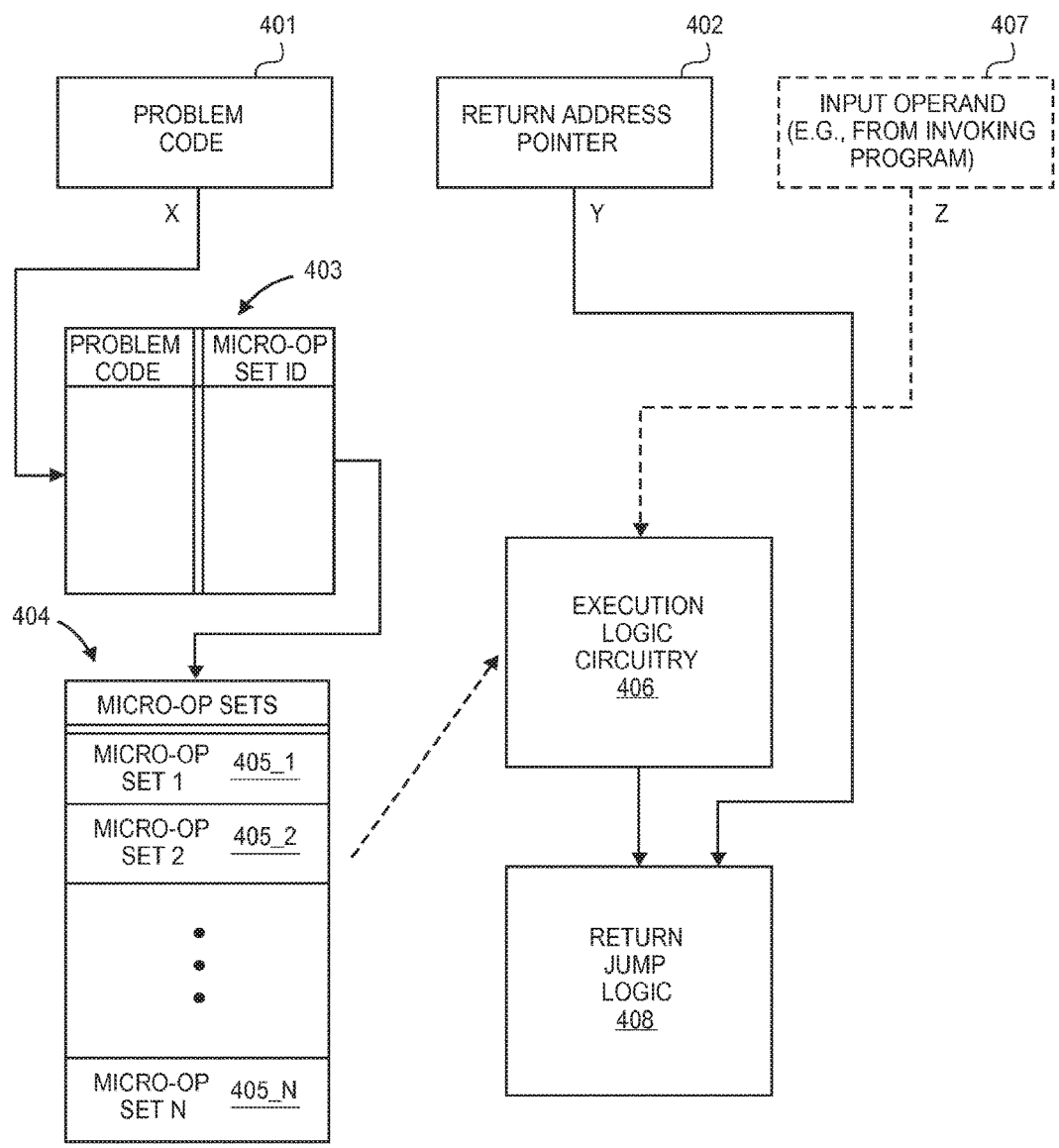
FIG. 4 shows an embodiment of execution unit logic circuitry capable of executing an instruction that corresponds to the improved interrupt handling approach.

FIG. 4 shows an embodiment of the circuit design of a functional unit having the functionality to perform the IRETOVLD X Y instruction. As observed in FIG. 4, the logic design includes a first register 401 to store the first operand X (problem code) and a second register 402 to store the second operand Y (return address pointer). In operation, the problem code X is presented to a first ROM circuit 403 that acts as a look-up table. A second ROM circuit 404 holds different sets of micro-code 405_1 to 405_N. Each set of micro-code corresponds to the microcode used to handle a particular interrupt. With N sets of such microcode in the second ROM circuit 404, the IRETOVLD X Y instruction has embedded hardware support for N interrupts. Note that more generally, circuits 403 and 404 can be referred to as storage circuits. Here, any type of storage circuit can be used.

The look-up table (first ROM circuit 403) correlates, for each different value of X that may be presented to the functional unit, a pointer to a specific set of micro-code in the second ROM circuit 404. Thus, during execution, when the program code input operand X is presented to the first ROM circuit 403, the first ROM circuit 403 presents an output that points to a particular set of micro-ops in ROM circuit 404 that are designed to handle the specific problem that the value of X corresponds to. Said another way, the pointer from ROM 403 points to one of the sets amongst sets 405_1 to 405_N.

As an example, consider a simple implementation where N=2 (i.e., only two different interrupts are supported). Here, consider the first hardware supported interrupt to be a translation look-aside buffer (TLB) page miss, and, the second hardware supported interrupt to be a call by a specific SOC logic block (such as an accelerator, e.g., a graphics accelerator) for input parameters.

In order to properly handle a TLB page miss interrupt, virtual and physical page numbers having the needed translation information need to be inserted into a TLB structure (which may be cached and/or in memory). In order to properly handle a call by an SOC logic block for input parameters, the SOC logic block needs to be provided with address information that identifies where the information can be found (e.g., in register space or in memory).

As such, a first set of microcode 405_1 in ROM 404 includes the micro-op s needed to insert virtual and physical page numbers into a TLB, and, a second set of micro-code 405_2 includes the micro-ops needed to understand where the inputs desired by the accelerator are stored and provide their respective addressing information to the SOC logic block.

Logic circuitry 406 includes the logic circuitry needed to perform these operations. In an embodiment, the logic circuitry 406 acts like a mini programmable machine that "executes out of" ROM 404 with the set of micro-code identified at the output of lookup table 403.

Note that the interrupt may include additional parameters besides the problem code X and the return pointer address Y. For example, the specific parameters that the SOC logic block needs would need to be expressed by the invoking program. In order to identify the desired parameters, logic 406 would need this information. As such, in an embodiment, the IRETOVLD instruction can take the form of IRETOVLD X Y Z where Z holds additional input information (e.g., provided by the invoking program and/or certain system related information) needed to implement the function of the interrupt handling. As such, as observed in FIG. 4, a third input operand register 407 is coupled to logic 406.

When logic 406 completes its handling of the interrupt, return jump logic 408 is engaged to return the program flow to the invoking program. Return jump logic 408 includes logic circuitry akin to that of an unconditional program jump instruction. Return jump logic 408 accepts the return pointer address Y and essentially creates an unconditional jump to the invoking program at an instruction specified by return pointer Y.

Figure 5:
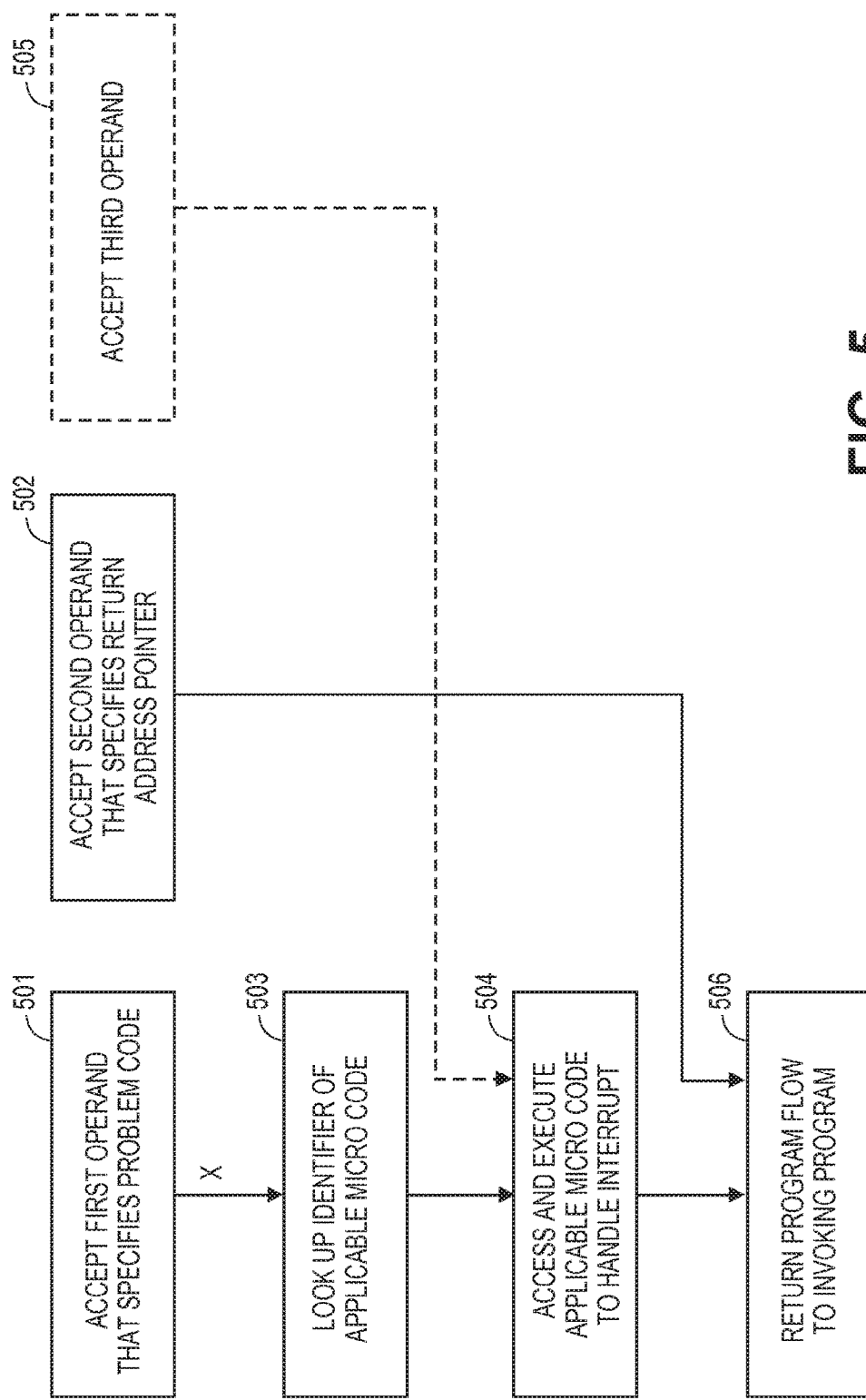
FIG. 5 shows a method that can be performed by the instruction execution logic of FIG. 4.

FIG. 5 shows an embodiment of a method that can be performed by the execution unit logic circuitry of FIG. 4. As observed in FIG. 4, a first input operand that specifies a particular interrupt is received from a first register 501, and, a second input operand that specifies a return address pointer is received in a second register 502.

The input operand from the first register is presented to a look up table circuit and a pointer to a set of micro-ops stored in a storage circuit within the execution unit is produced in response 503. The set of micro-ops correspond to the specific function that properly handles the specific interrupt specified in the first register. The set of micro-ops are then executed to handle the interrupt 504. Optionally, additional input operand information needed to handle the interrupt (e.g., provided by the invoking method) may be received from a third register 505 and used by the operating microcode to properly handle the interrupt. When the interrupt is handled, the return address pointer is used to return program flow back to the invoking method 506.

Figure 6:
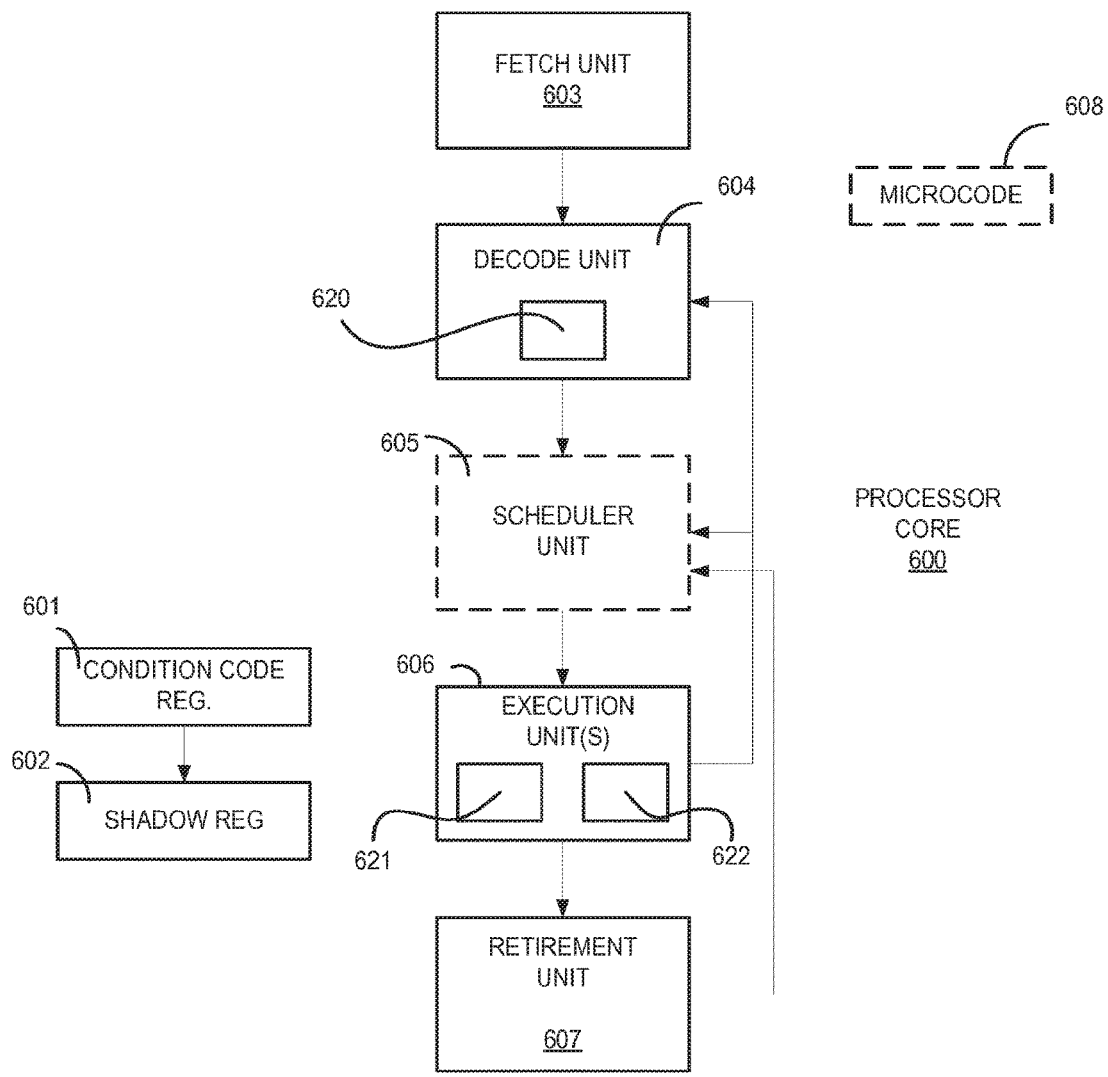
FIG. 6 shows a more detailed instruction execution pipeline.

FIG. 6 shows a generic processing core 600 that is believed to describe many different types of processing core architectures such as Complex Instruction Set (CISC), Reduced Instruction Set (RISC) and Very Long Instruction Word (VLIW) capable of implementing the IRETOVLD instruction as described above. The generic processing core 600 of FIG. 6 includes: 1) a fetch unit 603 that fetches instructions (e.g., from cache or memory); 2) a decode unit 604 that decodes instructions; 3) a schedule unit 605 that determines the timing and/or order of instruction issuance to the execution units 606 (notably the scheduler is optional); 4) execution units 606 that execute the instructions; 5) a retirement unit 607 that signifies successful completion of an instruction. Notably, the processing core may or may not include microcode 608, partially or wholly, to control the micro operations of the execution units 606. The instruction execution resources/logic referred to in pre-ceding discussions may be implemented with one or more of the execution units within execution units 606.

Figure 7:
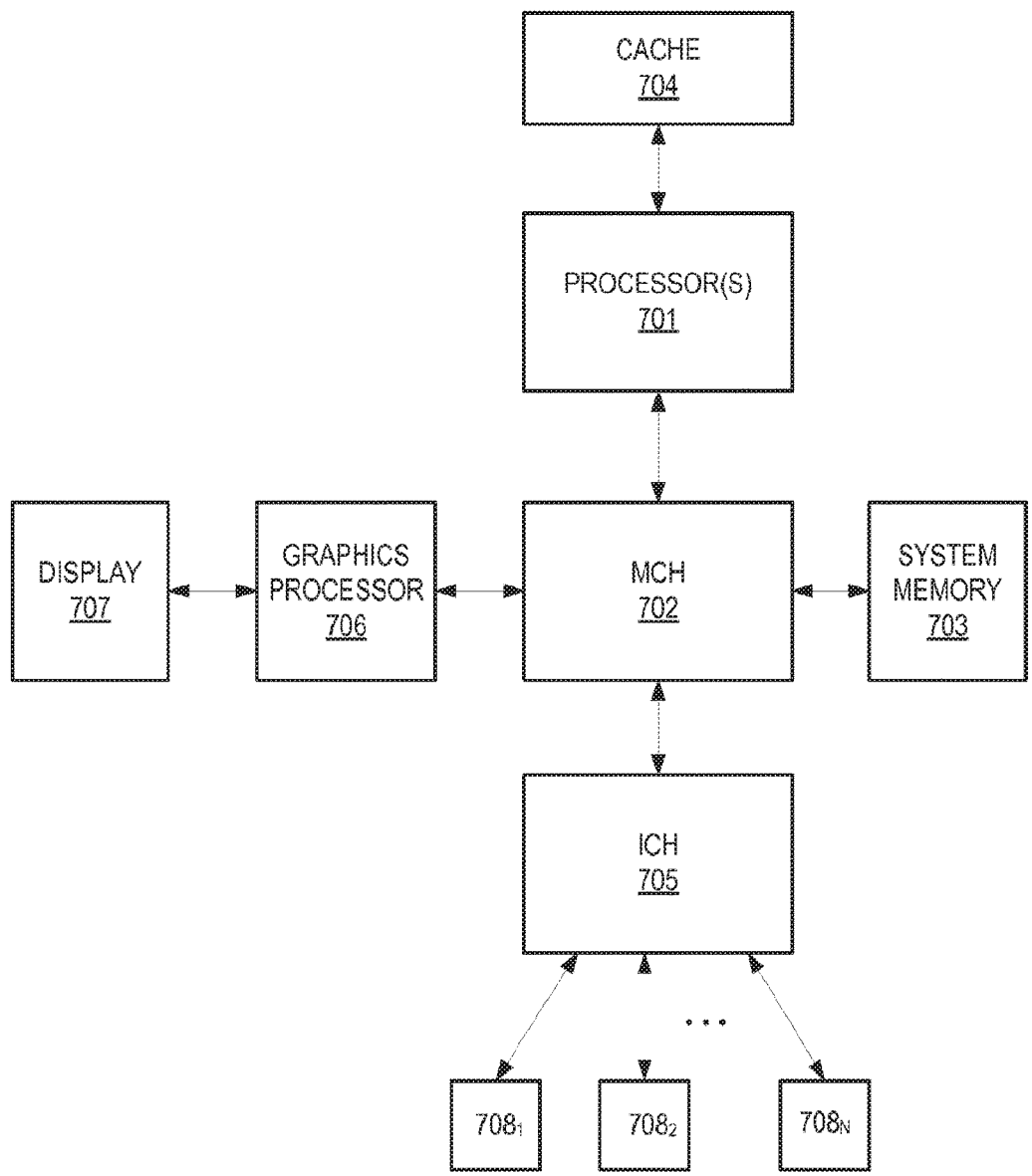
FIG. 7 shows a computing system.

A processing core having the functionality described above can be implemented into various computing systems as well. FIG. 7 shows an embodiment of a computing system (e.g., a computer). The exemplary computing system of FIG. 7 includes: 1) one or more processing cores 701 that may be designed to include two and three register scalar integer and vector instruction execution; 2) a memory control hub (MCH) 702; 3) a system memory 703 (of which different types exist such as DDR RAM, EDO RAM, etc,); 4) a cache 704; 5) an I/O control hub (ICH) 705; 6) a graphics processor 706; 7) a display/screen 707 (of which different types exist such as Cathode Ray Tube (CRT), flat panel, Thin Film Transistor (TFT), Liquid Crystal Display (LCD), DPL, etc.) one or more I/O devices 708.

The one or more processing cores 701 execute instructions in order to perform whatever software routines the computing system implements. The instructions frequently involve some sort of operation performed upon data. Both data and instructions are stored in system memory 703 and cache 704. Cache 704 is typically designed to have shorter latency times than system memory 703. For example, cache 704 might be integrated onto the same silicon chip(s) as the processor(s) and/or constructed with faster SRAM cells whilst system memory 703 might be constructed with slower DRAM cells. By tending to store more frequently used instructions and data in the cache 704 as opposed to the system memory 703, the overall performance efficiency of the computing system improves.

System memory 703 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 703 prior to their being operated upon by the one or more processor(s) 701 in the implementation of a software program. Similarly, data that a software program determines should be sent from the computing system to an outside entity through one of the computing system interfaces, or stored into an internal storage element, is often temporarily queued in system memory 703 prior to its being transmitted or stored.

The ICH 705 is responsible for ensuring that such data is properly passed between the system memory 703 and its appropriate corresponding computing system interface (and internal storage device if the computing system is so designed). The MCH 702 is responsible for managing the various contending requests for system memory 703 access amongst the processor(s) 701, interfaces and internal storage elements that may proximately arise in time with respect to one another.

One or more I/O devices 708 are also implemented in a typical computing system. I/O devices generally are responsible for transferring data to and/or from the computing system (e.g., a networking adapter); or, for large scale non-volatile storage within the computing system (e.g., hard disk drive). ICH 705 has bi-directional point-to-point links between itself and the observed I/O devices 708.

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.) or may be compiled directly into object code.

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims.

What is claimed is:

1. A processor comprising:
   a decoder to decode a single instruction into a decoded, single instruction; and
   an execution unit to execute the decoded, single instruction to:
      perform an operation on an input parameter of the single instruction, and
      return program control to an invoking program that was interrupted, wherein an instruction set supported by the processor does not include a separate instruction to perform the operation, and the operation is an insert operation to insert virtual and physical addresses into a translation look-aside buffer.

2. The processor of claim 1, wherein the virtual and physical addresses are input operands of the single instruction.

3. The processor of claim 1, wherein the insert operation is a first operation to be performed by the execution unit, the execution unit is to also perform a second operation to pass input parameters to an accelerator of the processor, and the single instruction includes an input operand of a problem code to indicate which of the first operation and the second operation are to be performed by execution of the decoded, single instruction.

4. The processor of claim 1, wherein the operation is to pass input parameters to an accelerator of the processor.

5. The processor of claim 4, wherein the input parameters are input operands of the single instruction.

6. The processor of claim 1, wherein a same opcode of the single instruction, when executed on a second processor, is to return program control to an invoking program that was interrupted but is not to perform an operation on an input parameter of the single instruction.

7. A method comprising:
   decoding a single instruction with a decoder of a processor into a decoded, single instruction; and
   executing the decoded, single instruction with an execution unit of the processor to:
      perform an operation on an input parameter of the single instruction, and
      return program control to an invoking program that was interrupted, wherein an instruction set supported by the processor does not include a separate instruction to perform the operation, and:
         the operation is an insert operation inserting virtual and physical addresses into a translation look-aside buffer,
         the operation is passing input parameters to an accelerator of the processor, or
         a same opcode of the single instruction, when executed on a second processor, is to return program control to an invoking program that was interrupted but is not to perform an operation on an input parameter of the single instruction.

8. The method of claim 7, wherein the operation is the insert operation inserting virtual and physical addresses into the translation look-aside buffer.

9. The method of claim 8, wherein the virtual and physical addresses are input operands of the single instruction.

10. The method of claim 8, wherein the insert operation is a first operation to be performed by the execution unit, the execution unit is to also perform a second operation to pass input parameters to an accelerator of the processor, and the single instruction includes an input operand of a problem code indicating which of the first operation and the second operation are to be performed by execution of the decoded, single instruction.

11. The method of claim 7, wherein the operation is passing input parameters to the accelerator of the processor.

12. The method of claim 11, wherein the input parameters are input operands of the single instruction.

13. The method of claim 7, wherein the same opcode of the single instruction, when executed on the second processor, is to return program control to the invoking program that was interrupted but is not to perform the operation on the input parameter of the single instruction.

14. A processor comprising:
a decoder to decode a single instruction into a decoded, single instruction; and
an execution unit to execute the decoded, single instruction to:
perform an operation on an input parameter of the single instruction, and
return program control to an invoking program that was interrupted, wherein an instruction set supported by the processor does not include a separate instruction to perform the operation, and the operation is to pass input parameters to an accelerator of the processor.

15. The processor of claim 14, wherein the operation is an insert operation to insert virtual and physical addresses into a translation look-aside buffer.

16. The processor of claim 15, wherein the virtual and physical addresses are input operands of the single instruction.

17. The processor of claim 15, wherein the insert operation is a first operation to be performed by the execution unit, the execution unit is to also perform a second operation to pass input parameters to an accelerator of the processor, and the single instruction includes an input operand of a problem code to indicate which of the first operation and the second operation are to be performed by execution of the decoded, single instruction.

18. The processor of claim 17, wherein the input parameters are input operands of the single instruction.

19. The processor of claim 14, wherein a same opcode of the single instruction, when executed on a second processor, is to return program control to an invoking program that was interrupted but is not to perform an operation on an input parameter of the single instruction.

20. A processor comprising:
a decoder to decode a single instruction into a decoded, single instruction; and
an execution unit to execute the decoded, single instruction to:
perform an operation on an input parameter of the single instruction, and
return program control to an invoking program that was interrupted, wherein an instruction set supported by the processor does not include a separate instruction to perform the operation, and a same opcode of the single instruction, when executed on a second processor, is to return program control to an invoking program that was interrupted but is not to perform an operation on an input parameter of the single instruction.

21. The processor of claim 20, wherein the operation is an insert operation to insert virtual and physical addresses into a translation look-aside buffer.

22. The processor of claim 21, wherein the virtual and physical addresses are input operands of the single instruction.

23. The processor of claim 21, wherein the insert operation is a first operation to be performed by the execution unit, the execution unit is to also perform a second operation to pass input parameters to an accelerator of the processor, and the single instruction includes an input operand of a problem code to indicate which of the first operation and the second operation are to be performed by execution of the decoded, single instruction.

24. The processor of claim 20, wherein the operation is to pass input parameters to an accelerator of the processor.

25. The processor of claim 24, wherein the input parameters are input operands of the single instruction.

* * * * *